United States Patent [19]

Standal

[11] 4,216,794
[45] Aug. 12, 1980

[54] IRRIGATION WATER DISCHARGE VALVE

[76] Inventor: Norman S. Standal, Star Rte., Bliss, Id. 83314

[21] Appl. No.: 953,702

[22] Filed: Oct. 23, 1978

Related U.S. Application Data

[62] Division of Ser. No. 711,986, Aug. 5, 1976, Pat. No. 4,159,080.

[51] Int. Cl.² .................. F16L 29/00; F16L 37/28
[52] U.S. Cl. .................. 137/322; 239/711; 251/149
[58] Field of Search .......... 137/322, 344; 251/149, 251/318; 239/184, 185, 186, 187, 212, 213

[56] References Cited

U.S. PATENT DOCUMENTS

| | | | |
|---|---|---|---|
| 2,898,128 | 8/1959 | Shohan | 137/322 |
| 2,979,072 | 4/1961 | Webster | 137/322 |
| 3,195,563 | 7/1965 | Race, Jr. | 137/344 |
| 3,443,581 | 5/1969 | Lyell | 137/322 |
| 3,444,941 | 5/1969 | Purtell | 137/344 |
| 3,532,110 | 10/1970 | Peterson | 137/322 |
| 3,537,470 | 11/1970 | Cornelius | 137/344 |
| 3,575,200 | 4/1971 | Imeson | 137/344 |
| 3,590,869 | 7/1971 | Von Linsowe | 137/344 |
| 3,984,052 | 10/1976 | DiPalma | 239/183 |
| 4,036,436 | 7/1977 | Standal | 239/183 |

Primary Examiner—Irwin C. Cohen
Assistant Examiner—G. L. Walton
Attorney, Agent, or Firm—Wells, St. John & Roberts

[57] ABSTRACT

A water discharge valve designed to be coupled by means of an automated irrigation system. The water discharge valve comprises an enlargement having spherical surfaces at the upper end of a vertical riser and housing a ball that opens or closes the valve in response to the water or in response to an actuating member mounted on the movable irrigation system.

6 Claims, 15 Drawing Figures

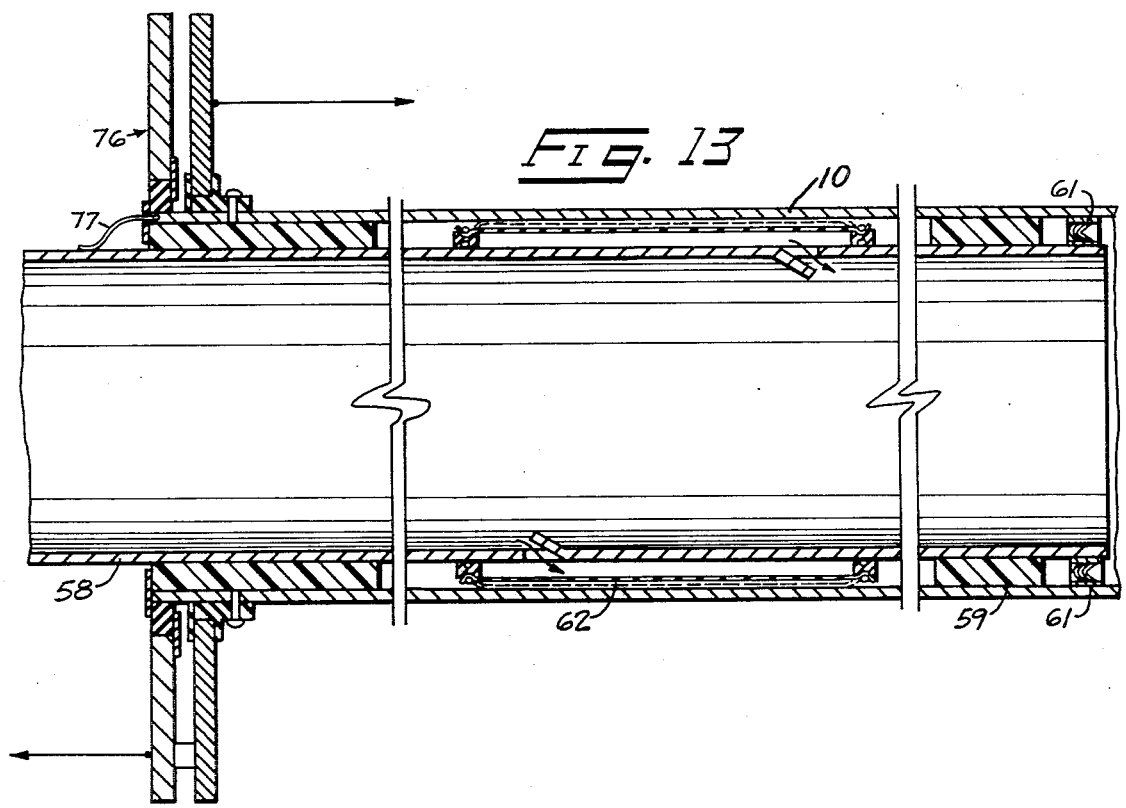
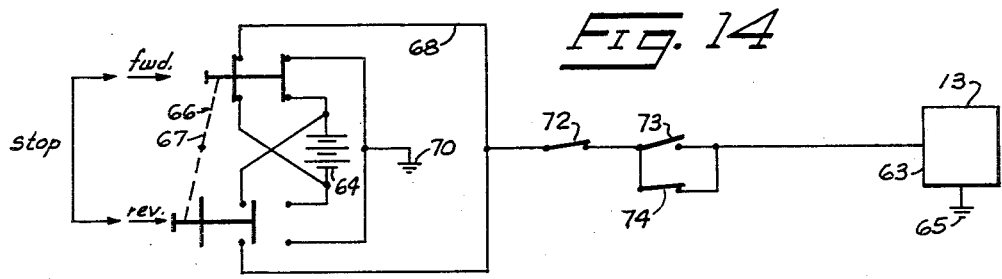
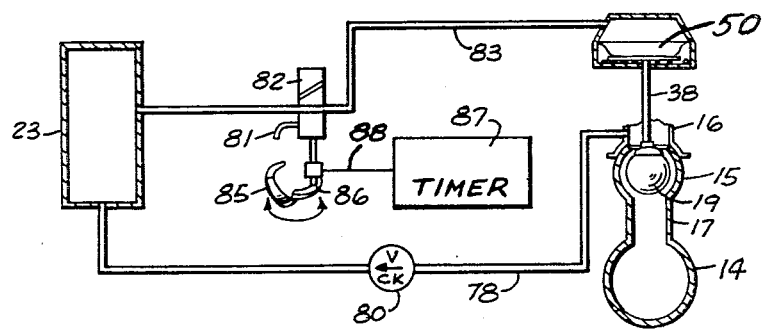

IRRIGATION WATER DISCHARGE VALVE

RELATED APPLICATIONS

This is a division of co-pending patent application Ser. No. 711,986, which was filed Aug. 5, 1976, now U.S. Pat. No. 4,159,080 and is titled "Irrigation Apparatus".

BACKGROUND OF THE INVENTION

The present irrigation apparatus is designed to automate sprinkling of a field by use of a wheel-supported lateral pipeline having a plurality of sprinklers spaced along a center pipeline axis. A lateral pipeline is selectively supplied with water from a stationary water supply line having a plurality of water discharge valves spaced along its length. The apparatus is alternately in a stationary mode adapted to be hydraulically coupled to the water supply line through a selected water discharge valve, or in a traveling mode uncoupled from the water supply line and with the lateral pipeline powered for movement in a direction parallel to the supply line. The novel combination comprises a carriage guided along the water supply line, a structural fluid connection between the lateral pipeline and the carriage and sensing means for indexing the carriage by reference to a selected water discharge valve. A valve actuator on the carriage completes a hydraulic circuit from the water supply line to the lateral pipeline through the structural fluid connection. The entire apparatus is controlled sequentially from the carriage.

DESCRIPTION OF THE DRAWINGS

FIG. 13 is an enlarged fragmentary sectional view taken along line 13—13 in FIG. 1;

FIG. 14 is a schematic view of the electrical controls; and

FIG. 15 is a schematic view of the hydraulic controls.

DESCRIPTION OF THE PREFERRED EMBODIMENTS

Figure 1:
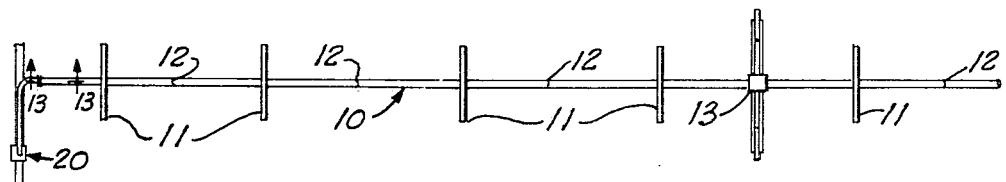
FIG. 1 is a schematic plan view of a wheel move irrigation system according to this disclosure.

General Arrangement: The present invention is illustrated as it applies to automation of wheel move irrigation systems. A typical wheel move irrigation system to which the invention might be applied is illustrated in FIG. 1. A lateral pipeline 10 extends across the transverse width of the field to be irrigated. The lateral pipeline 10 is adapted to be moved from one end of the field to the other in a direction perpendicular to the width of the field as measured across the length of pipeline 10. To accomplish such movement, the pipeline 10 has a plurality of spaced wheels 11 mounted to it. Wheels 11 are typically fixed to pipeline 10 in a coaxial arrangement. The pipeline 10, which is the water conduit across the field, also serves as the driving axle for wheels 11 and is commonly referred to as a "torque tube". A plurality of sprinklers 12 are spaced along the center axis of pipeline 10 to discharge water onto the field in a desired pattern while the lateral pipeline is stationary. Sprinklers 72 are typically fixed to pipeline 10 and rotate with its as it is moved from place to place. Alternate types of sprinklers might be used along draglines extending rearwardly from pipeline 10 or on rotatable mounts so that they remain upright during rotation of pipeline 10.

The lateral pipeline 10 is driven by a prime mover 13. This essentially comprises a frame extending to one or both sides of the pipeline 10 and terminating in ground-engaging wheels at its outer ends that serve as reaction members to counter the torque applied to rotate pipeline 10 about its center axis. The prime mover 13 is typically provided with a gasoline powered motor coupled to the pipeline 10 by a reversible transmission, or a clutch or drive sprockets and chains. The motor provides a low speed, high torque rotational force applied to the lateral pipeline 10 to turn about its center axis. Prime mover 13 is usually centered along pipeline 10, the pipeline then serving to transmit this rotational force outward along its length to the wheels 11.

The pipeline 10 is typically provided with water from a stationary water supply line 14 oriented along the length of the field perpendicular to the pipeline 10. Line 14 can be above ground or below ground. The water supply line 14 is arranged parallel to the intended direction of movement of the lateral pipeline 10, although the precise movement of pipeline 10 in practice in seldom exactly parallel to the water supply line 14 because of ground surface variations. Also, the substantial length of a lateral pipeline results in rotational "winding" of the pipeline from each end to the center, causing variations in the movement of the wheels spaced along its length.

The water supply line 14 is provided with a plurality of water discharge valves 15 on vertical risers spaced along its length. They are typically spaced apart by a distance equal to the normal spacing between the prearranged settings of lateral pipeline 10 along the length of the field.

In a conventional manual operation, the pipeline 10 is moved by manual operation of prime mover 13, which rotates the pipeline 10 and wheels 11 to transport pipeline 10 from one setting to the next. At each setting the inlet end of pipeline 10 is manually connected to the adjacent water discharge valve 15, which is then manually operated to supply water to the sprinklers 12 while the pipeline 10 is stationary. This typically requires manual movement of the pipeline 10 every few hours. The substantial amount of manual labor involved in utilizing wheel move irrigation systems is a detrimental factor and has led the irrigation industry away from this pioneering type of irrigation system to much more complicated and expensive continuously moving lateral sprinklers and center pivot sprinkler irrigation systems.

Figure 2:
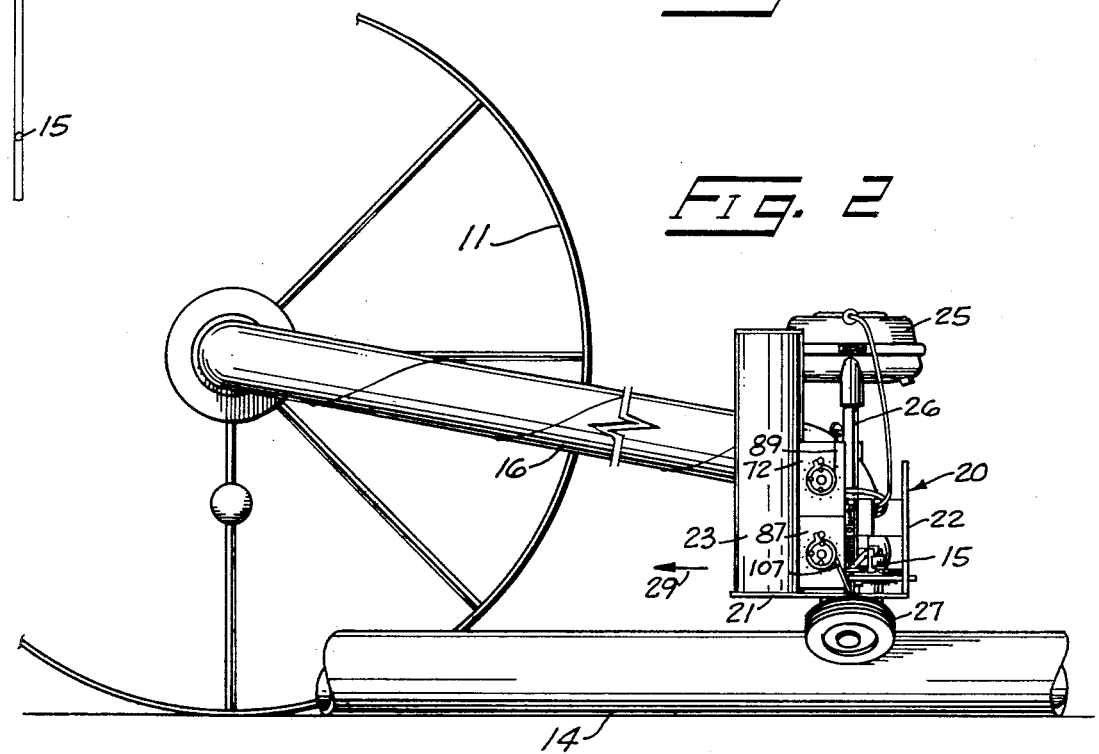
FIG. 2 is a fragmentary end view from the left in FIG. 1.
Figure 3:
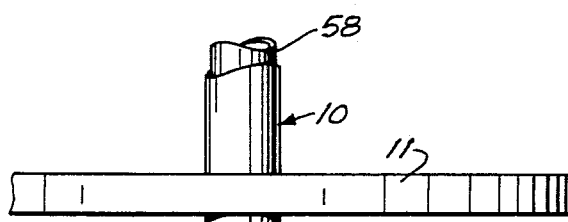
FIG. 3 is an elevation view of the elements shown in FIG. 2.
Figure 3:
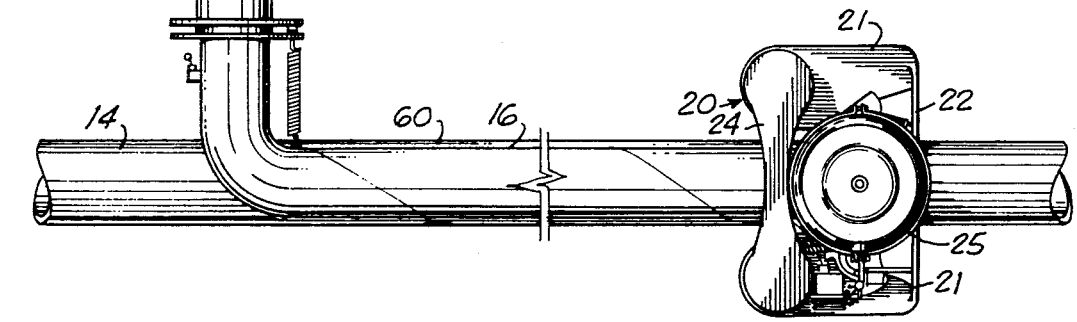

As can be seen in FIGS. 1 through 3, the present improvement provides an automated carriage 20 which travels along the water supply line 14 in unison with movement of lateral pipeline 10 in a direction parallel to the length of water supply line 14. Carriage 20 is operatively connected to lateral pipeline 10 by means of a structural fluid conduit 16, which is rotatably journalled by pipeline 10 during travel along a field. Automatic sensing means is provided on carriage 20 for indexing purposes to locate its position with respect to each water discharge valve 15. A valve actuator means is provided on carriage 20 to automatically couple and disconnect the fluid conduit 16 to a selected valve 15.

Controls are provided on carriage 20 for all functions required to automate movement of prime mover 13 and to synchronize such functions with operation of the devices mounted on carriage 20. Carriage 20 automatically controls operation of the lateral pipeline 10 between a stationary mode wherein it is hydraulically coupled to the water supply line 14 through a selected water discharge valve 15 or an alternate traveling mode wherein the lateral pipeline 10 is powered by prime mover 13 for movement along the length of the field in a direction parallel to the length of water supply line 14.

Figure 4:
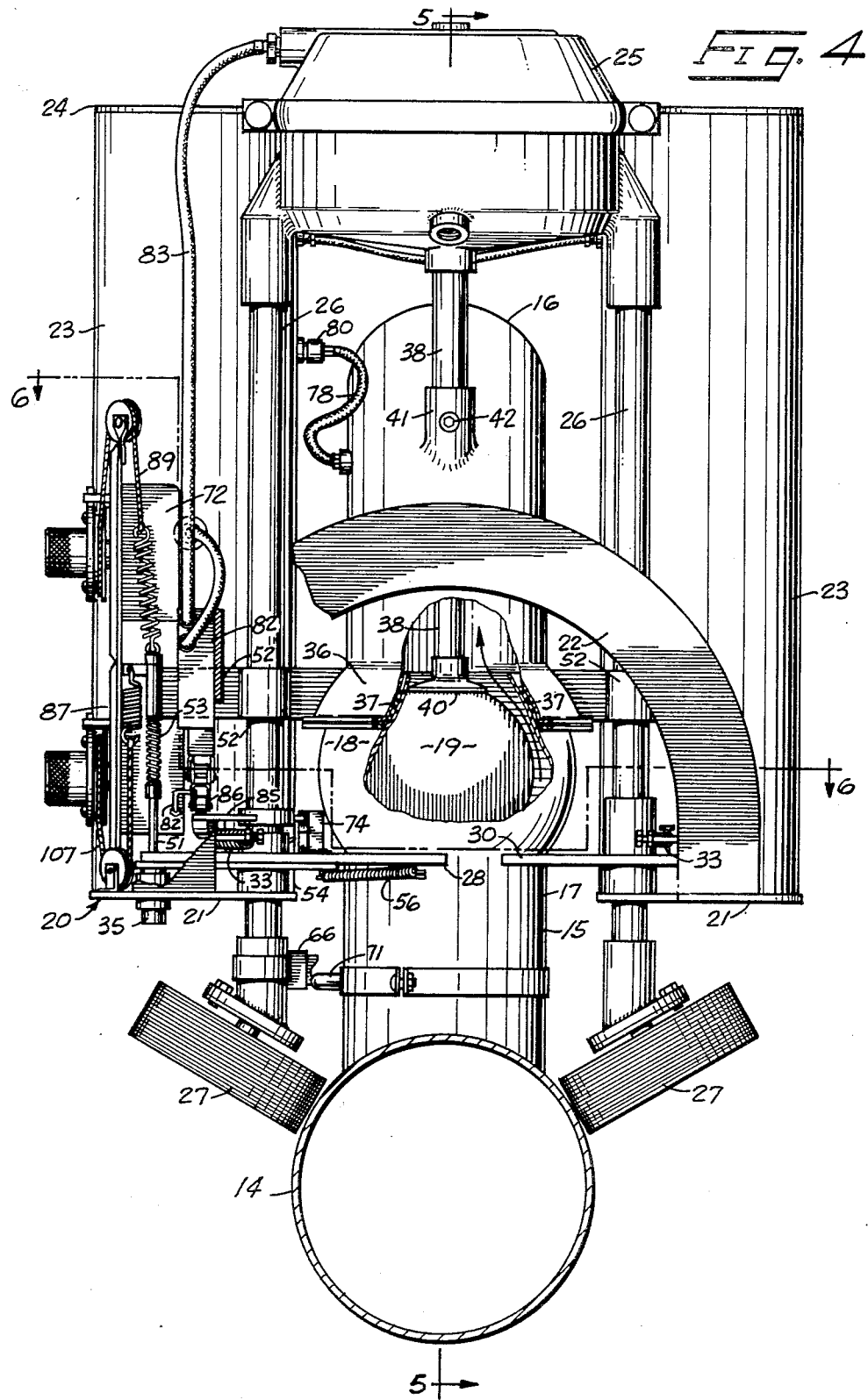
FIG. 4 is an enlarged view of the carriage as seen from the right in FIG. 2, with portions of some elements being broken away.
Figure 5:
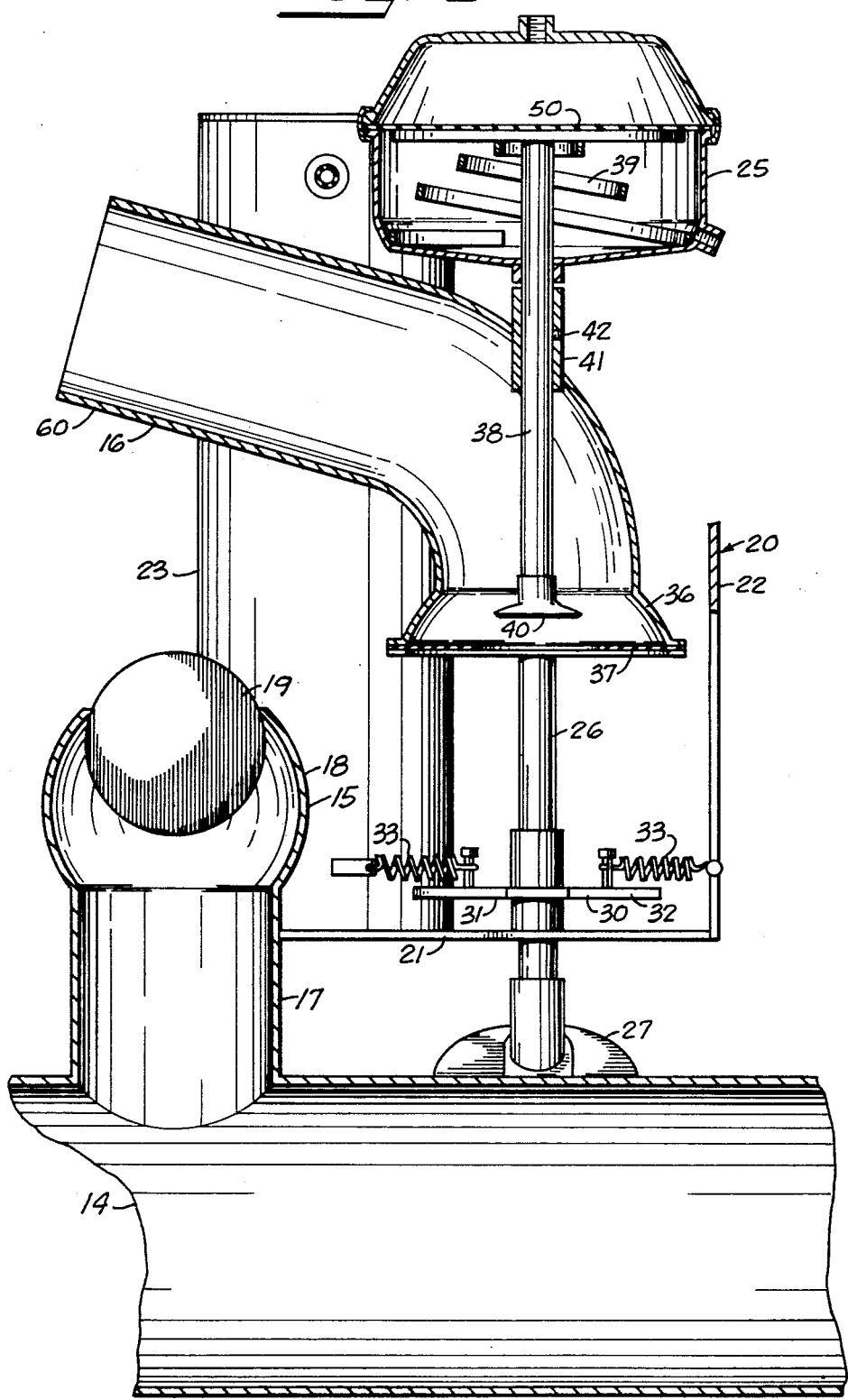
FIG. 5 is a sectional view taken along line 5—5 in FIG. 4, with the valve actuator in its open position and clear of a riser.

Water Discharge Valve: FIGS. 4 and 5 illustrate details of a special water discharge valve mounted along water supply line 14 and particularly adaptable to the automated control and operational sequences described below.

Water discharge valve 15 is mounted at the upper end of a vertical riser 17 that is in open communication with the supply line 14. The height of the riser 17 is immaterial, but will normally be substantially uniform along the length of a given water supply line 14, whether line 14 is above or below ground level. In the case of a buried or below ground water supply line 14, there might be variations in the heights of risers 17 above the ground surface. An alternate carriage support to accommodate such variations is disclosed below.

At the upper end of each riser 17 is a spherical enlargement 18 having interior and exterior spherical surfaces. The open rim at the upper end of the enlargement 18 is circular and is of a diameter less than the spherical diameter of a ball 19 located within the enlargement 18. Ball 19 is preferably made of material that floats in water, its buoyancy being utilized in conjunction with the water pressure within supply line 14 to normally maintain ball 19 in a closed or sealed position at the upper end of the spherical enlargement 18. As a typical example, ball 19 can be machined of wood and covered with a suitable resilient plastic resin capable of sealing engagement against the interior walls of the spherical enlargement 18 without permanent deformation. The illustrated valve 15 is therefore normally maintained in a closed condition by the water pressure within supply line 14. It can be opened by physically moving ball 19 in a vertical downward direction to center it within the spherical enlargement 18. This concentric spherical configuration results in a minimum of hydraulic restriction through the riser.

Connecting Fluid Conduit: Fluid conduit 16 basically comprises a structural fluid connection mounted between the inlet of lateral pipeline 10 and carriage 20 for permitting elevational and lateral movement of the inlet of pipeline 10 relative to the carriage 20 while imparting translational movement to the carriage 20 in a direction parallel to the length of the water supply line 14 in unison with movement imparted to the lateral pipeline 10 in a direction parallel to the length of water supply line 14 while the lateral pipeline 10 is in its traveling mode. As shown in FIGS. 1, 2 and 13, it comprises a horizontal extension 58 and a perpendicular coupler drop 60 leading to the flanged outboard end of fluid conduit 16 described below with respect to the details of carriage 20.

The horizontal extension 58 is shown as having a diameter less than the interior diameter of the lateral pipeline 10, and is telescoped within the open outer end of pipeline 10 for free movement parallel to the axis of pipeline 10 when the sprinkler apparatus is in its traveling mode. The fluid conduit 16 is at the same time also freely rotatable with respect to lateral pipeline 10 so that the pipeline 10 can roll during movement along the field without rotating the depending coupler drop 60 and carriage 20. To accomplish this, an expandable water seal 61 and a suitable outer bushing 59 rotatably mount horizontal extension 58 within the interior of the lateral pipeline 10 (FIG. 13).

While the seal 61 automatically expands to engage the interior of lateral pipeline 10 when the pipeline 10 is provided with water under pressure, it does not adequately resist axial movement of pipeline 10 with respect to the coaxial horizontal extension 58 of the fluid conduit 16 due to interior water pressure. To secure the horizontal extension 58 within pipeline 10 against such axial movement when the irrigation apparatus is in its stationary mode for sprinkling purposes, there is provided a circumferential bladder 62 wrapped about the horizontal extension 58 adjacent to its inner end. The horizontal extension 58 is perforated about the interior of bladder 62 so as to permit water under pressure within horizontal extension 58 to flow through bladder 62 and expand it against the interior circumference of pipeline 10 to provide a substantial area of engagement to frictionally resist any movement between lateral pipeline 10 and the horizontal extension 58.

It is to be noted that the operation of the seal 61 and bladder 62 both depend upon interior water pressure and are therefore an automatic function of the pressurization of lateral pipeline 10. They assure that there will be no further relative movement between the fluid conduit 16 and lateral pipeline 10 during the time in which the conduit 16 is coupled to a stationary riser 17 and there is hydraulic communication from the selected water discharge valve 15 and the sprinklers along the lateral pipeline 10. They assure free relative motion in the absence of water pressure.

Carriage: Carriage 20 is illustrated in detail in FIGS. 4 through 8, and is generally shown in FIGS. 2 and 3. It comprises a rigid framework including two horizontal base plates 21 which straddle the risers 17 at each side as carriage 20 moves along the length of water supply line 14. Base plates 21 are connected to one another by a rigid transverse arch 22 which is welded or suitably fixed across corresponding ends of the plates 21. The opposite ends of base plates 21 support a pair of upright rigid hollow tanks 23 connected by a transverse upper brace 24. Both arch 22 and brace 24 are vertically positioned on carriage 20 to clear the upper end of each riser 17 encountered along water supply line 14. A stationary actuator housing 25 is centered across carriage 20 by a pair of guide rods 26. Guide rods 26 are fixed between bosses fixed to the housing 25 and base plates 21. The stationary guide rods 26 are mounted in vertical upright positions parallel to one another at the respective sides of the carriage framework.

Guide means are operatively mounted between the carriage 20 and water supply line 14. The purpose of the guide means is to maintain the path of movement of the carriage parallel to the length of the line 14. This can be accomplished by reference to either the water supply line 14 or the risers 17. In the preferred embodiment illustrated in FIGS. 2 through 8, guide wheels 27 are used for this guiding purpose. Guide wheels 27 mounted to the lower ends of guide rods 26 tangentially engage the water supply line 14 at opposite sides of its center axis and serve as rolling guides to maintain proper spatial positioning of carriage 20 as it moves along the length of water supply line 14.

Carriage 20 is provided with sensing means to detect the presence of each riser 17 as the carriage moves along water supply line 14 and to index the location of carriage 20 along the length of line 14 in preparation for actuation of a referenced water discharge valve 16 and subsequent hydraulic control through conduit 16. This sensing arrangement is best illustrated in the operational sequence shown in FIGS. 6, 7 and 8.

Figure 6:
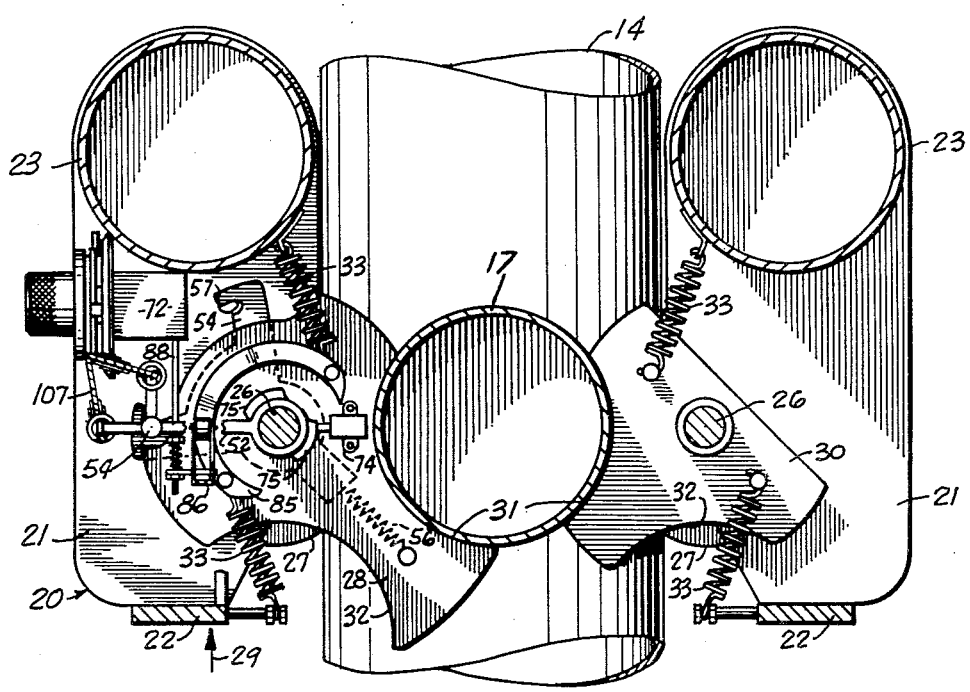
FIG. 6 is a sectional view taken along line 6—6 in FIG. 4.
Figure 7:
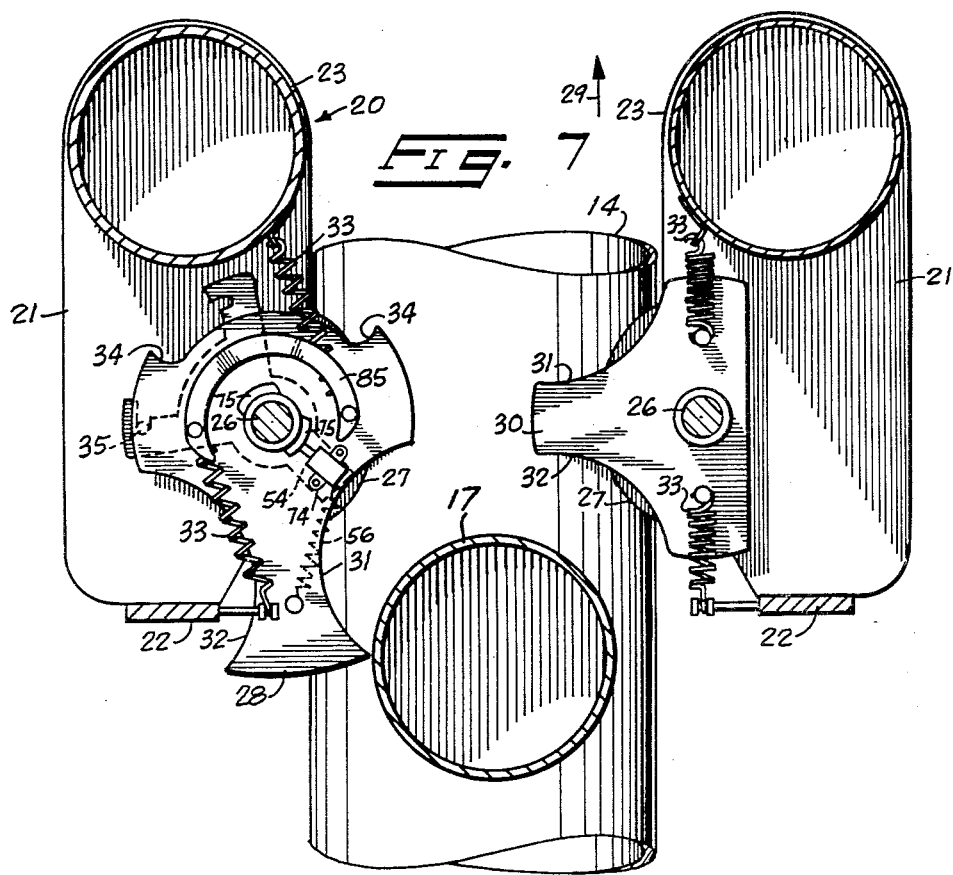
FIG. 7 is a schematized view similar to view 6, showing release of a riser.
Figure 8:
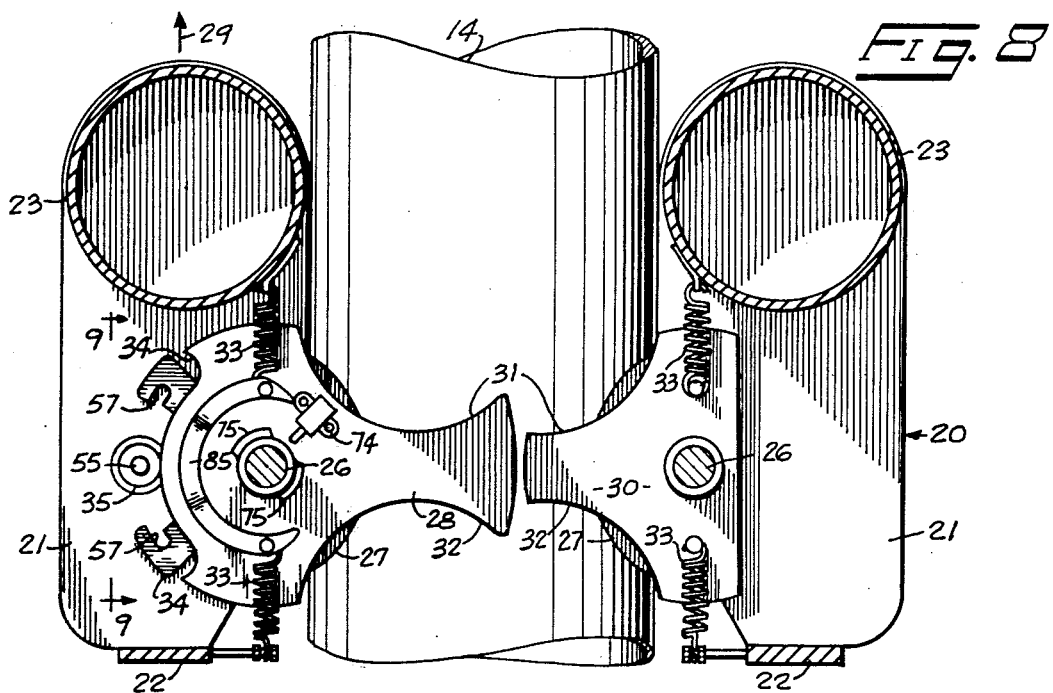
FIG. 8 is a schematized view similar to FIG. 6, showing the normal travel position.

The sensing means comprises a mechanical escapement that accurately grasps or cradles each riser at opposite sides of its circumference. It is designed to locate and engage a riser 17 during movement of carriage 20 along supply line 14 in either direction. While FIGS. 6, 7 and 8 are drawn to illustrate the sequential operation of the sensing means when carriage 20 is being moved along line 14 in the direction shown by arrow 29, it is to be understood that an identical sequence of events will occur should carriage 20 engage a riser 17 while moving in the opposite direction.

Engagement of riser 17 is accomplished by two cam plates 28, 30 pivotally mounted about the respective guide rods 26 at the opposite sides of carriage 20. Each cam plate 28, 30 is free to pivot about the axis of the rod 26 on which it is mounted. The cam plates 28, 30 are arranged in a horizontal position perpendicular to guide rods 26. When not in engagement with a riser 17, they are centered in alignment with one another across the carriage 20 in the positions shown in FIG. 8. They are yieldably maintained in these positions by opposed centering tension springs 33. While cam plates 28, 30 are free to pivot about the axes of guide rods 26 as influenced by engagement with a riser 17, they are yieldably urged to their central or neutral position shown in FIG. 8 by the centering springs 33.

Complementary circular cam surfaces 31, 32 are formed across the respective cam plates 28, 30 above the water supply line 14. The circular cam surfaces 31, 32 are formed to a diameter slightly larger than the outer cylindrical diameter of the risers 17. They are spaced outward from the axes of guide rods 26 by a distance permitting complementary circumferential engagement of each riser 17 by the cam plates 28, 30 when the riser 17 is indexed in transverse alignment between the guide rods 26 (FIG. 6).

As illustrated, one cam plate 28 extends outward from its supporting guide rod 26 a distance greater than does the remaining cam plate 30. The distance illustrated is such that the engagement between riser 17 and cam surface 31 will extend to the center line of water supply line 14 when a riser 17 is centered between guide rods 25. This provides maximum longitudinal contact across the surface of riser 17 to physically oppose continued movement of carriage 20 in the direction shown by arrow 29.

Carriage 20 is designed to mechanically prevent its continued movement past the operational position shown in FIG. 6 until the controls associated with it have completed all functions required while the lateral pipeline 10 is in its stationary mode.

Figure 9:
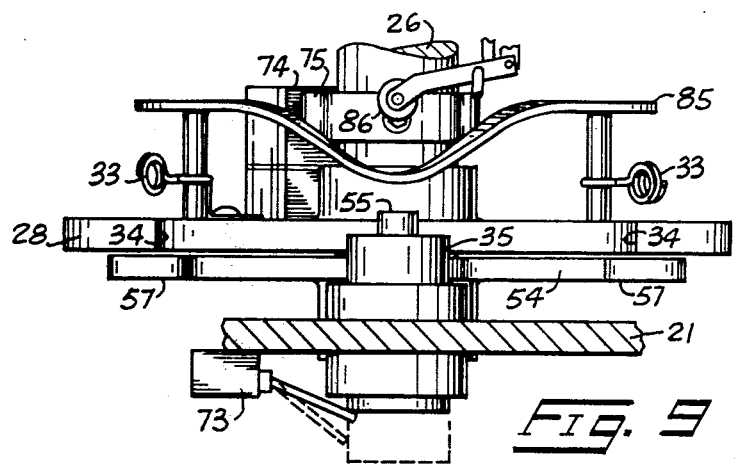
FIG. 9 is an enlarged fragmentary view taken along line 9—9 in FIG. 8.

To mechanically or physically prohibit such further movement, a movable stop bolt 35 is mounted through base plate 21 beneath the back side of cam plate 28. The solid stop bolt 35 has a substantial diameter and is spring mounted so as to be yieldably urged to an upwardly protruding position with respect to base plate 21 wherein it intersects the operational plane of cam plate 28. Its raised or upper position is illustrated in full lines in FIG. 9. The back side of cam plate 28 has complementary shoulders 34 spaced arcuately about the axis of the guide rods 26 to physically abut stop bolt 35. Since abutment of shoulder 34 by stop bolt 35 physically prevents further pivotal movement of cam plate 28 about its supporting guide rod 26, the carriage 20 is thereby prevented from any continued movement along the length of water supply line 14 until the stop bolt 35 is moved to the retracted or lower position shown in dashed lines in FIG. 9.

The arcuate cam plates 28, 30 are mounted to carriage 20 to sense the presence of a riser 17 and physically center it in a predetermined indexed location with respect to the movable carriage 20. The flanged outboard end of fluid conduit 16, which is movably mounted to carriage 20, is then properly centered above the selected riser 17 for coupling and engagement to the water discharge valve 15.

The outboard end of fluid conduit 16 is bent to present a downwardly facing vertical opening that is flanged at 36. The interior of flange 36 is complementary to the exterior spherical configuration of the enlargement 18 at the upper end of riser 17. A circular gasket 37 is fixed across the opening presented by flange 36 to provide a pressure seal between the spherical enlargement 18 and the flange 36. The outboard end of fluid conduit 16 is vertically movable from a closed position, wherein it engages a selected water discharge valve 15 centered by the cam plates 28, and 30 and completes a hydraulic circuit from the water supply line 14 to the lateral pipeline 10, and an open position vertically clear of the water discharge valve 15 to accommodate movement of carriage 20. The closed position is illustrated by FIG. 4 and the open position is illustrated by FIG. 5.

An actuator rod 38 extends downwardly from the center of the stationary actuator housing 25 and into the interior of the fluid conduit 16 coaxial with the opening at flange 36. Actuator rod 38 is fixed to the fluid conduit 16 by a locking screw 42 received through a guide boss 41 on the exterior of the fluid conduit 16.

The actuator housing 25 illustrated in the drawings is a typical pneumatic brake cylinder used in the trucking industry. It basically comprises a transverse movable diaphragm 50 which is yieldably urged by spring 39, to a raised position (FIG. 5), but which is movable downwardly under hydraulic or pneumatic pressure to a lowered position (FIG. 4).

The lower end of actuator rod 38 has a downwardly facing enlarged cup 40 fixed at its outer end. Cup 40 has a lower concave surface adapted to engage the upper portion of ball 19 within riser 17 so as to push the ball 19 downwardly in opposition to the water pressure. The elevational position of cup 40 relative to flange 36 is such that flange 36 and gasket 37 will form an initial hydraulic seal against spherical enlargement 18 before the cup 40 engages and moves ball 19 to complete the hydraulic circuit from the water supply line 14 to the fluid conduit 16.

The lower end of fluid conduit 16 is guided by a pair of bearings 52 mounted to it at opposite sides of the carriage 20. The bearings 52 are slidably guided on the guide rods 26 to assure proper vertical movement of the outboard end of fluid conduit 16 with respect to the framework of carriage 20. This guide arrangement assures that the actuator rod 38 will remain parallel to the fixed guide rods 26 to permit proper movement of the fluid conduit 16 without binding.

As can be seen in FIG. 4, an actuator pin 51 is mounted outward from the bearing 52 above cam plate 28 on a projecting bracket 52. The vertical axis along the center of pin 51 is coaxial with the vertical axis of stop bolt 35. Pin 51 moves upwardly and downwardly relative to the framework of carriage 20 in unison with the outboard end of fluid conduit 16. It is slidably guided within bracket 59 and is urged downward by a compression spring 53 having sufficient force to move stop bolt 35 to its lower or retracted position. Spring 53 permits over-travel of bracket 59 so as to assure proper retraction of stop bolt 35 each time that the outboard end of fluid conduit 16 is seated on the spherical enlargement 18 of a riser 17.

As can be seen in FIG. 4, the described arrangement provides a positive clamping pressure across the top of riser 17. Because of the interconnecting carriage framework, and particularly the mounting of the actuator housing 25 and cam plates 28, 30 on the common guide rods 26, there is a direct vertical application of force in an upward direction between the cam surfaces 31, 32 and the lower partial circumference of spherical enlargement 18 and the flange 36 and an equal opposing downward force applied between the flange 36 and the upper circumference about the opening of spherical enlargement 18. This assures a proper high pressure hydraulic seal for efficient transfer of water between the stationary riser 17 and the movable fluid conduit 16. When the valve actuator assembly is operative in the closed position, the carriage 20 is actually slightly lifted relative to the water supply line 14 and the guide wheels 27 can disengage from contact with the line 14.

Figure 10:
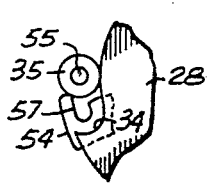
FIGS. 10, 11 and 12 are fragmentary plan views showing operation of the stop bolt.
Figure 11:
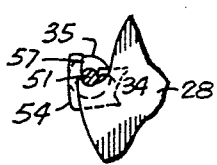
Figure 12:
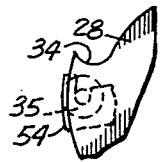

In order to permit the cam plate 28 to pivot beyond the position shown in FIG. 6 to permit passage of carriage 20 past the indexed riser 17, there is provided a stop bolt retaining plate 54 immediately beneath the cam plate 28. Stop bolt retaining plate 54 is parallel to cam plate 28 and is also pivotally mounted on the guide rod 26 that mounts cam plate 28. Its back side is provided with two slotted lugs 57 which are complementary to an upwardly protruding pin 55 formed at the upper surface of stop bolt 35. The plate 54 is freely pivotable about the axis of the guide rod 26 which supports it. It is moved by a yieldable connection to the cam plate 28. This yieldable connection is shown as a light tension spring between the outermost end of cam plate 28 and the center of plate 54 facing toward the opposite side of carriage 20. Spring 56 is visible in FIG. 4 and is illustrated in dashed lines in FIGS. 6 and 7. The operation of plate 54 is illustrated in FIGS. 10, 11 and 12.

As cam plate 28 moves to one side or the other, the retaining plate 54 will be urged in the same direction of pivotal movement. It first abuts the stop bolt 35 and prevents further pivotal movement of retaining plate 54 under the continuing tension force applied through the spring 56 on the moving cam plate 28 (FIG. 10). However, when the stop bolt 35 is retracted to the position shown in dashed lines in FIG. 9, the retaining plate 54 is then free to continue its pivotal movement until the intersecting pin 55 is abutted within the receiving slot of the engaged lug 57 (FIG. 11). In this condition, the stop bolt 35 is maintained in its retracted position due to its engagement against the lower surface of the slotted lug 57. See FIG. 6. When carriage 20 is again moved along the length of water supply line 14, the arcuate cam plates 28, 30 are then free to pivot beyond the point of engagement of shoulder 34 and stop bolt 35 to clear the riser 17 in the manner illustrated in FIGS. 7 and 12. When riser 17 is cleared by both plates 28, 30, they will return to their centered transverse positions shown in FIG. 8. At the same time, tension spring 56 will return the retaining plate to its centered condition. As soon as the slotted lug 57 clears the top of stop bolt 35, it will be automatically returned to its normal raised position shown in full lines in FIG. 9 and the entire sensing apparatus will have been reset in preparation for engagement with a subsequent riser.

Prime Mover Controls: FIG. 14 is a schematic view of a simple electrical control for operating the prime mover 13 in a forward or reverse direction. In this simplified control, a motor control 63 is utilized in conjunction with a direct current power source 64, such as a storage battery. The battery 64 can be mounted directly to the carriage 20, although the specific mounting is not shown in the remaining drawings. The mover control 63 is grounded at 65. It is designed to operate the prime mover in one direction of travel when the ground is positive and in an opposite direction of travel when the ground at 65 is negative. It stops the movement of prime mover 13 when no current is supplied to ground at 65. By utilizing the metal components of carriage 20, fluid conduit 16 and lateral pipeline 10 as a ground connection, the prime mover 13 can be effectively controlled through an additional single wire between carriage 20 and motor control 63. The motor control 63 can be a relay control for an electric motor or can be an automatic control for a gasoline engine. While many additional functions can be added to choke an engine, operate a clutch, etc., only the essential functions of the forward, reverse and stop controls will be described herein.

Battery 64 has its terminals connected to opposite sides of a double pole, double throw switch 66 having a pivoted operating lever 67 movable between a forward position, a reverse position, and an open or stop position. As shown, in the forward position the negative terminal of battery 64 is connected to the control line 68 to the motor control 63 and the positive terminal of battery 64 is connected to ground at 70. In its reverse position the switch 66 connects the positive terminal of battery 64 to line 68 and the negative terminal to ground at 70. In its open or neutral position, neither terminal of battery 64 is connected to either line 68 or ground at 70 and therefore no power can be dissipated from battery 64.

The switch 66 is preferably mounted at the inboard side of the guide rod 26 that pivotally supports the principal cam plate 28. As can be seen in FIG. 4, this locates all of the control components at one side of carriage 20. The lever 67 faces the risers 17 and can be contacted by protruding tabs 71 fixed to selected risers 17.

Two differing lengths of tabs 71 can be selectively utilized to operate lever 67 as carriage 22 moves past a riser 17. A short extension would be mounted to a riser 17 to pivot the lever 67 to its neutral position and stop all further operation of the prime mover 13. Such a tab would be mounted to an end riser where no further operation of the lateral pipeline 10 is desired after the carriage 20 reaches the selected riser. If it is desired that the lateral pipeline reverse itself, a longer extension on a tab 71 would be used to contact the lever 67 and pivot it to either the forward or reverse position, depending upon its initial direction of travel. The longer extension of a tab 71 is shown in FIG. 4.

Line 68 is connected in series to the normally closed contacts of a mechanical drain timer 72. This timer 72 is mounted to carriage 20 and can be seen in FIGS. 2 and 4. Line 68 also contains parallel switches indicated by the reference numbers 73 and 74. Switch 73 is a stop bolt sensor and can be seen in FIG. 9. It is mounted to the under side of the base plate 21 adjacent to stop bolt 35. It is normally open when the stop bolt 35 is in its raised position and is closed when the stop bolt 35 is in its retracted position.

Switch 74 is a stop switch and is operated by pivotal movement of cam plate 28. As can be seen in FIGS. 6, 7 and 8, the switch 74 is fixed to the upper surface of cam plate 28 and moves in unison with it about the guide rod 26. It is actuated by alternate lobes 75 fixed to the guide rod 26. Switch 74 is normally closed, and is opened when the riser 17 is centered between the guide rods 26 (FIG. 6). It remains open while the riser 17 clears the engaging cam plate 28 (FIG. 7). It again closes when the cam plate 28 returns to its neutral transverse position (FIG. 8).

The stop bolt sensor 73 assures that line 68 is an open circuit so long as the stop bolt 35 is in its raised position, where stop bolt 35 physically prevents further movement of carriage 20 due to the physical abutment of riser 17, cam plate 28 and stop bolt 35. The stop switch 74 serves to initially sense the presence of a riser 17 between the guide rods 26 of carriage 20 and opens the line 68 to terminate operation of prime mover 13 when this position has been reached. Limit switches (not shown) may be mounted to the outer end of lateral pipeline 10 to detect extreme inward or outward movement of lateral pipeline 10 relative to the horizontal extension 58 of fluid conduit 16. They would be in series in line 68. Should misalignment of lateral pipeline 10 result in axial movement between pipeline 10 and the horizontal extension 58 beyond the physical limits of the telescoping length of the horizontal extension 58, one or the other of these switches would open to shut down the operation of the prime mover 13 until the situation has been manually corrected.

Line 68 is electrically connected along the rotatable lateral pipeline 10 by a conventional slip ring assembly 76 (FIG. 13) having a rotatable member mounted on an insulator on pipeline 10 and a stationary member similarly mounted on horizontal extension 58 of fluid conduit 16. A continued ground contact is assured by a conductor 77 resiliently connected to pipeline 10 and maintained in contact with extension 58. The stationary member in slip ring assembly 76 may be prevented from rotation by use of a pendulum (not shown).

Hydraulic Controls: FIG. 15 schematically illustrates the hydraulic controls that operate the movable diaphragm 50 and actuator rod 38 to selectively close or open the valve actuator assembly.

In the illustrated embodiment, the water under pressure within supply line 14 is stored on carriage 20 and used to actuate the water discharge valve 15. With the valve 15 operative for sprinkling as illustrated, water is supplied to the interior of the hollow tanks 23 through a bleed hose 78 including a check valve 80. The bleed hose 78 is tapped to the outboard end of fluid conduit 16 upwardly adjacent to flange 36. The interiors of the two tanks 23 are in open hydraulic communication through a connecting length of hose (not shown).

Operational control of the hydraulic elements is effected by a valve 82. Valve 82 moves between a first position wherein the interior of the tanks 23 is in hydraulic communication with the area above diaphragm 50 within the stationary actuator housing 25, and a second position wherein the area above diaphragm 50 is exhausted to atmosphere at 81 through connecting hose 83.

Valve 82 is moved to its first or operative position by a cam 85 fixed to the upper surface of the arcuate cam plate 28. A cam follower 86 actuates valve 82 after cam plate 28 has pivoted to the position shown in FIG. 6 with the riser 17 centered between guide rods 26. When valve 82 is activated, the hydraulic pressure within the tanks 23, which serve as accumulators, is directed to the interior of housing 25 to force the actuator rod 38 downwardly and operate the water discharge valve 15. While the water discharge valve 15 is activated, the hose 78 will direct water under pressure through check valve 80 to the interior of the tanks 23 to recharge them.

A mechanical irrigation timer 87 mounted to carriage 20 serves to mechanically move valve 82 to its deactivated condition through a linkage shown at 88 (FIG. 6). It overrides cam 85 to allow valve 82 to move down. This exhausts the pressure above diaphragm 50 and causes the actuator rod 38 to be lifted due to the biasing spring built into the diaphragm 50. This removes the source of water pressure from hose 78. The pressure is maintained within the charged tanks 23 due to the presence of check valve 80 within the connections to hose 78.

Timer Controls: The illustrated apparatus uses two mechanical timers to control the time during which the field is irrigated by sprinklers 12 and the time between irrigating and moving the lateral pipeline 10, during which the pipeline 10 is drained automatically by conventional valves provided along its length. The irrigation timer 87 resets valve 82 to drain the valve actuating device and terminate the connection of fluid conduit 16 and the selected water discharge valve 15. The drain timer 72 closes the switch contacts in line 68 to begin operation of the motor control 63 after the time necessary to drain the pipeline 10.

Both timing units are mechanically set by pulleys and cables operated in response to movement of the outboard end of fluid conduit 16 along guide rods 26 (FIGS. 4, 6). Cable 107 sets irrigation timer 87 as the outboard end of fluid conduit 16 moves upwardly and releases timer 87 for operation as it moves to its closed position. Cable 89 sets drain timer 72 as the outboard end of fluid conduit 16 moves downwardly and releases timer 87 for operation as it moves to its open position. This arrangement incorporates the use of conventional mechanical timers and it is to be understood that electronic timing circuits or time delay circuits can be substituted if desired.

Sequence of Operation: The operational functions of the elements incorporated in the apparatus have been described above. The following will simply capsule the sequence that occurs as the carriage 20 moves from riser to riser.

Assuming that carriage 20 is moving along water supply line 14 in the direction shown by arrow 29 in FIGS. 6, 7 and 8, an operational cycle will begin with contact of riser 17 by the complementary cam plates 28, 30. This initial contact will instigate pivotal movement of the cam plates 28, 30 in response to the continuing movement of carriage 20. The cam plates 28, 30 act as detectors to sense the presence of riser 17. This is translated into an electrical signal by opening of stop switch 74. This opens the circuit to the motor control 63 and stops the continued operation of prime mover 13. However, since the prime mover 13 might continue to impart slight rolling movement to the lateral pipeline 10, and the outer ends of lateral pipeline 10 might continue to roll slightly due to the resilient "winding" along its extreme length, the raised stop bolt 35 will be mechanically engaged by shoulder 34 to physically interlock the carriage 20 to riser 17 in the location or indexed position shown in FIG. 6. The stop bolt 35 therefore physically prevents any further movement of carriage 20.

Just shortly after opening of switch 74, the rotary cam 85 will move the cam follower 86 to activate valve 82 to its raised position as shown in FIG. 15. This directs water under pressure from tanks 23 to the area above diaphragm 50 and initiates downward movement of actuator rod 38. As actuator rod 38 begins to move downwardly, the cable 89 starts to set the drain timer 72. This immediately opens the drain timer contacts shown at 72 in FIG. 14, which maintains the circuit to the motor control 63 in an open condition throughout the remainder of the time in which carriage 20 is in its stationary mode.

As the actuator rod 38 moves downwardly, the gaskets 37 will form a seal about the exterior of the spherical enlargement 18, completed by positive pressure between the enlarged flange 36 at the outboard end of fluid conduit 16, which clamps against the enlargement 18 in opposition to the engagement of enlargement 18 by the cam surfaces 31, 32 on the cam plates 28, 30. As soon as that seal is complete, the cup 40 at the lower end of actuator rod 38 moves the ball 19 to its open position (FIG. 4). During the downward movement of actuator rod 38, pin 55 engages stop bolt 35 and pushes it to the retracted position shown in dashed lines in FIG. 9. It is retained in the retracted position by the overlapping engagement of the slotted lug 57 as shown in FIG. 11. Retraction of stop bolt 35 also closes the stop bolt sensor at switch 73. Switch 73 acts as an interlock to prevent completion of the electrical control circuit to motor control 63 at any time stop bolt 35 is in its raised condition physically preventing pivotal movement of cam plate 28.

When the actuator rod 38 has completed its downward movement, the drain timer 72 will have been set by cable 89 and the irrigation timer 87 will be released for operation. The various elements on carriage 20 will remain in this operational condition through the period of time preset on the timer 87.

At the conclusion of operation of irrigation timer 87, valve 82 is mechanically reset to its lower position, which drains the area above diaphragm 50 and initiates upward movement of actuator rod 38. This upward movement first closes the water discharge valve 15 by permitting ball 19 to seat within the spherical enlargement 18, and then opens the water seal about the exterior of the valve. Actuator rod 38 is returned to its elevated position shown in FIG. 5, and carriage 20 remains stationary. As the actuator rod 38 is raised, the irrigation timer 87 is reset for the next cycle, and the drain timer 72 is released. The drain timer 72 is preset to prevent closing of the electrical circuit to the motor control 63 during a time sufficient to assure gravity draining of water from the lateral pipeline 10.

At the conclusion of the cycle controlled by the drain timer 72, the contacts shown at 72 in FIG. 14 close, completing a circuit to motor control 63 through the closed stop bolt sensor switch 73. This initiates operation of the prime mover 13 and completes the cycling of the apparatus to its traveling mode.

As the carriage 20 begins to move, the cam plates 28, 30 swing about their pivotal connections to clear riser 17 as shown in FIG. 7. When cam plate 28 clears riser 17, it is returned to its neutral position shown in FIG. 8. This resets the cam follower 86 that controls the valve 82, which remains in its lower position. At the same time, the stop switch 74 is closed just prior to opening of the stop bolt sensor switch 73. This timed relation of switches 74, 73 assures continuation of the electrical circuit during the transition from the stationary mode to the traveling mode and clearance of riser 17. After riser 17 has been cleared, the switch 73 is in its normally open condition. Switch 74 is in its normally closed condition. The drain timer contacts at 72 are in their normally closed condition. The irrigation timer 87 is wound or set for subsequent operation and the flange 36 at the outboard end of fluid conduit 16 is raised to clear the water discharge valves 15 along the supply line 14. Carriage 20 will continue moving in unison with the lateral pipeline 10 until stop switch 74 is again activated to begin a subsequent cycle.

As described above, reversal or stopping of the carriage 20 is accomplished by special tabs 71 which engage the lever 67 to operate switch 66.

Having described my invention, I claim:

1. A riser valve for an irrigation water supply line that is adapted to be releasably coupled to a pipeline having a coupler which includes: (1) lower riser engaging members having curved engaging surfaces; (2) an upper coupling fluid conduit having a flared terminal end; (3) an annular inner seal mounted at the flared terminal end; and (4) a valve actuating means, said riser valve comprising:

an upright riser having exterior cylindrical walls generated about a central riser axis;

an exterior enlargement stationarily affixed at the upper end of the riser in open communication with the riser interior, said enlargement having (1) a lower exterior diverging spherical surface complementary to the curved engaging surfaces of the lower riser engaging members and adapted to be engaged thereby and an upper exterior converging spherical surface to be coupled to the fluid conduit with the annular inner seal interposed between the upper exterior converging spherical surface and the flared terminal end of the fluid conduit when the lower riser engaging members engage the lower exterior spherical surface;

wherein the lower and upper spherical surfaces of the enlargement have an exterior radius greater than the exterior radius of the upright riser and wherein the lower exterior spherical surface of the enlargement intersects the upright riser across a first plane perpendicular to the riser axis at the joinder between the enlargement and the riser;

the upper end of the enlargement having an aperture formed through the upper exterior spherical surface thereof, said aperture being centered about the riser axis and intersecting the upper exterior spherical surface across a second plane perpendicular to said axis; and movable means mounted within the enlargement for selectively opening and closing said aperture in response to the valve actuating means.

2. A riser valve as set out in claim 1 wherein the aperture formed at the upper end of the enlargement is circular;

said last-named means comprising a spherical ball freely movable within the enlargement, the ball diameter being greater than the diameter of said aperture.

3. A riser valve for an irrigation water supply line that is adapted to be releasably coupled to a pipeline having a coupler having (1) lower clamping means; (2) upper clamping means; (3) drive means for moving one of the clamping means toward the other clamping means; and (4) valve actuating means, said riser valve comprising:

an upright riser affixed to the irrigation supply line and having a central riser axis;

an exterior radial enlargement stationarily affixed at the upper end of the riser having (1) a lower spherical surface generated about a common center of the central riser axis and adapted to be engaged by the lower clamping means of the coupler and (2) an upper spherical surface generated about a common center of the central riser axis and adapted to be engaged by the upper clamping means for clamping the coupler to the riser valve when the drive means moves one of the clamping means toward the other clamping means;

an opening extending through the upper end of the enlargement; and movable means within the enlargement responsive to the valve actuating means for opening and closing said opening.

4. A riser valve as set out in claim 3 wherein the opening has a circular configuration centered about said central axis.

5. A riser valve as set out in claim 3 wherein the opening has a circular configuration centered about said central axis;

said movable means comprising a spherical ball that is capable of floating in water, the diameter of said opening being less than the ball diameter.

6. A riser valve as set out in claim 3 wherein the opening is defined by an open circular rim at the upper end of said enlargement and centered about said central axis;

said movable means comprising a spherical ball capable of floating in water, the diameter of said opening being less than the ball diameter;

said ball having a resilient outer cover capable of sealing engagement at said rim without permanent deformation.

* * * * *